Oct. 25, 1955 P. H. TRICKEY ET AL 2,721,964
POWER TRANSMISSION
Filed May 2, 1952

*INVENTOR.*
PHILIP H. TRICKEY
EUGENE A. GROETEKE
BY Clement Reynolds
ATTORNEY

United States Patent Office 2,721,964
Patented Oct. 25, 1955

2,721,964

POWER TRANSMISSION

Philip H. Trickey, Webster Groves, and Eugene A. Groeteke, St. Louis, Mo., assignors to Vickers Incorporated, Detroit, Mich., a corporation of Michigan Application May 2, 1952, Serial No. 285,708

18 Claims. (Cl. 317—234)

This invention relates to power transmission and more particularly to a sealed arrangement of a plurality of rectifier elements of the metallic or blocking layer type, having asymmetric constituents, such as selenium, copper oxide, and so forth.

In general a blocking layer rectifier cell comprises a conductive supporting electrode, a layer of semi-conductive material such as crystalline selenium on a surface of the base plate, and a counter or front electrode in overlying contact with the semi-conductive material. The side of the cell with the semi-conductor and counter-electrode is considered the active side of the cell, and is sensitive to external disturbing agencies such as atmospheric attack. Usually the cells are assembled in stacks, for example by "stringing" a plurality of cells on an insulated rod with solid or spring contact washers between adjacent cells. In order to protect the active area of the cells the assembled stacks are usually coated with a covering film, for example, paint or varnish. Such a film may deteriorate with time, and often during its application will work itself between the counterelectrode and the adjacent contact washer resulting in a poor electrical connection.

In accordance with one embodiment of this invention a pair of dished rectifier plates are assembled facing each other to form a sealed chamber protectively enclosing the active areas and front electrodes in spaced apart relation, the like electrodes being connected to common terminals passing through the assembled unit in a manner that facilitates either series or parallel connection with adjacent units in a stack.

It is therefore an object of this invention to provide a new and useful sealed multiple cell rectifier unit.

Another object of this invention is to provide a novel sealed multiple cell rectifier unit with active cell areas protected from destructive surrounding conditions such as moisture, air, and so forth.

Another object is to provide a sealed multiple cell rectifier unit having novel mounting facilities.

A further object of this invention is to provide a compact sealed multiple cell rectifier unit having versatile stacking abilities.

Further objects and advantages of the present invention will be apparent from the following description, reference being had to the accompanying drawing wherein a preferred form of the present invention is shown.

Figure 1:
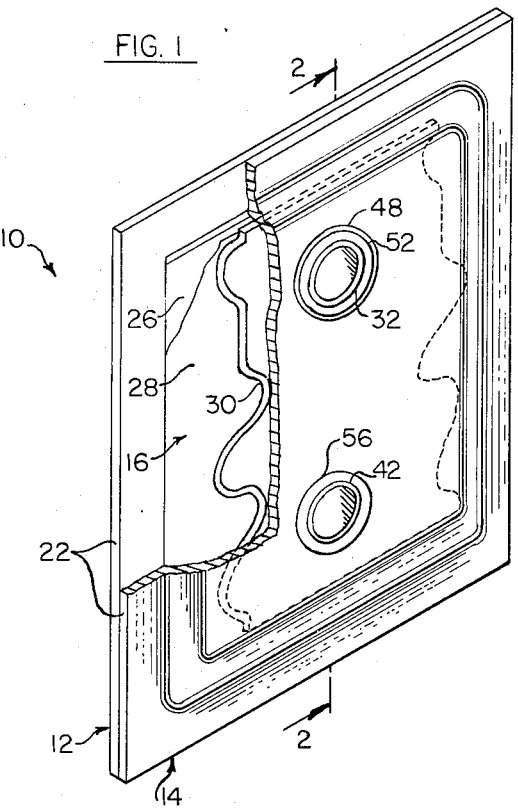
Figure 1 is a perspective view with parts broken away of a sealed rectifier unit embodying features of the invention.
Figure 2:
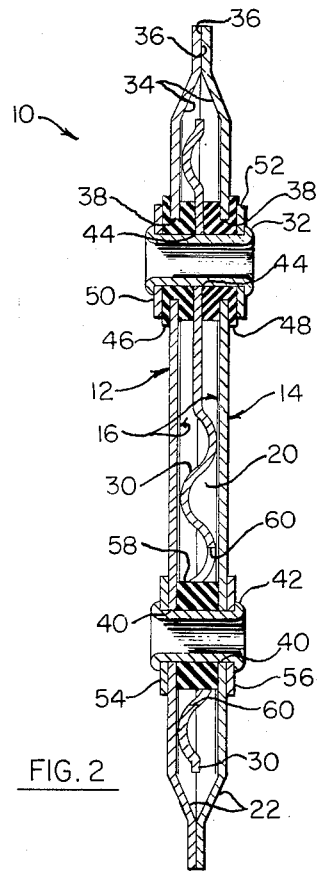
Figure 2 is a sectional view of the rectifier unit shown in Figure 1, the section being taken on the line 2—2 of that figure.
Figure 3:
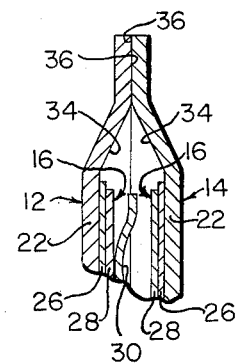
Figure 3 is an enlargement of the upper part of the view in Figure 2, showing an exaggerated detail of the active portions of the cells.

As shown in Figures 1, 2, and 3, the integral multiple cell rectifier unit 10 includes a pair of individual blocking layer rectifier cells 12 and 14 whose active sides 16—16 face each other in spaced apart relation in a sealed hollow chamber 20 having outer walls formed by supporting electrodes 22—22 of the respective cells 12 and 14. Each of the active sides 16—16 includes a semi-conductive layer 26 (Figure 3), such as crystalline selenium, carried by the supporting electrode 22, and an overlying counterelectrode 28 made from any suitable counterelectrode material for example, "Woods" metal. A contact element 30 in the form of a resilient, corrugated metal sheet or ribbon, provides an electrical connection between the counterelectrodes 28—28 of both cells and a common terminal 32.

The supporting electrode 22 of each cell is provided with a depressed area 34, which carries the semi-conductor 26 and its over-lying electrode 28, and which is offset from a surrounding flat rim 36. The supporting electrode 22 may be made of any suitable metal, for example, any one of the metals used for the back electrode of a blocking layer rectifier. In the case of selenium rectifiers a preferred material is aluminum, coated with a metal layer of the iron group, such as nickel, upon which the selenium layer is applied. Symmetrically located apertures 38 and 40 are provided in each half to receive conductive mounting members 32 and 42, such as tubular eyelets, which also constitute convenient electrical terminals for the integral unit. The symmetrical location of the eyelets 32 and 42 allows the unit to be mounted in either one of two reversed positions in a stack and occupy exactly the same space in either position.

In the example shown, the rims 36—36 of the respective supporting electrodes of both cells are bonded together to form a seal around the integral unit. The disclosed structure particularly lends itself to a metallic fusion bond between the contiguous rims. Although seam-welding is preferred other bonding methods may be used, for example soldering, brazing, etc.

The eyelet 32 passes through apertures 38—38 and through the contact member 30, the eyelet and the contact member 30 being bonded together at 44 as by soldering to form an electrical connection between the two. Insulating grommets 46 and 48 provide an effective seal and prevent undesirable short circuits between the stratified layers of the respective cells. Opposite ends of the eyelet 32 are upset against washers 50 and 52 to clamp the assembly in the vicinity of the eyelet.

The other eyelet 42 passes through apertures 40—40 in the two halves, and is upset at both ends against a pair of contact washers 54 and 56. An insulating washer 58 acts as a seal and maintains the individual cells in spaced apart relation against the clamping pressure of the eyelet 42. Both the eyelet 42 and the washer 58 pass freely through a large aperture 60 in the contact member 30.

In making the individual cells it is generally advisable to mask the area in the vicinity of the apertures 38 and 40 when the semi-conductor and the counterelectrode layers are applied in order to prevent direct shorts between the various strata in the vicinity of and at the edges of the apertures.

Methods of applying semi-conductive material such as selenium, etc., are well known in the art and need no explanation herein. Likewise there is no need to elaborate on counterelectrode materials, or methods of application, since they are well known in the art.

Figure 4:
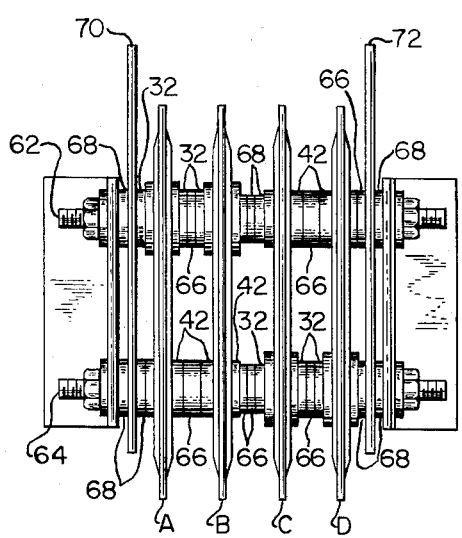
Figure 4 is a plan view of a rectifier stack incorporating a plurality of the sealed multiple-cell units shown in the other figures.

The axes of the eyelets 32 and 42 are substantially parallel to allow stack-mounting on a pair of parallel rods. A short stack assembly is shown in Figure 4 to illustrate the mounting versatility of the sealed units 10. A plurality of such units, A, B, C, D, are strung and clamped together on insulated rods 62 and 64. Conductive washers 66 and insulating washers 68 are used where required to effect the desired circuitry within the stack. Stack terminals are indicated at 70 and 72.

From the location of the mounting eyelets 32 and 42 of the respective units it will be apparent that units A and B are connected in parallel, i. e., electrodes of like polarity are connected together to counterelectrodes of B, etc. Units C and D are connected in the same manner. However, units B and C are connected in series, i. e., counterelectrode of one to back electrode of the other. Thus it is apparent that the mounting position of each unit 10 is reversible with respect to an adjacent unit.

Although the multi-cell unit 10 requires hardly any more space than a single individual cell in the conventional stacks heretofore used, it has nearly twice the power capabilities.

Sealed multiple cell units built in accordance with the present invention provide adequate cooling area, are compact, and efficient, provide adequate protection for the active areas without requiring protective films, and have versatile stack-mounting capabilities whereby the units can be mounted in reversed alternate positions without destroying the symmetry of the stack.

While the form of embodiment of the invention as herein disclosed constitutes a preferred form, it is to be understood that other forms might be adopted, all coming within the scope of the claims which follow.

What is claimed is as follows:

1. A rectifier assembly comprising, a pair of rectifier plates with like electrodes facing each other in spaced apart relation, means including said plates forming a sealed hollow chamber enclosing said electrodes, and resilient electrode contact means within said chamber.

2. A rectifier assembly comprising, a pair of rectifier plates with like electrodes facing each other in spaced apart relation, means including said plates forming a sealed hollow chamber enclosing said electrodes, and resilient means forming an electrical connection between said electrodes.

3. A rectifier assembly comprising a pair of dished rectifier plates in juxtaposed relation with the depressed surfaces of the plates facing each other, a semi-conductor and an associated counterelectrode supported on the depressed surface of each plate, means including said depressed surfaces defining a closed hollow chamber, a resilient counterelectrode contact member within said chamber, and a conductive tubular mounting member passing through said chamber and insulated from said plates, said tubular member and said resilient member being connected together whereby the tubular member constitutes a counterelectrode terminal.

4. A rectifier cell comprising a pair of juxtaposed rectifier plates, each having a depressed surface carrying a semi-conductor and an overlying electrode, means including said depressed surfaces in face to face relation defining a closed hollow chamber, means within said chamber forming an electrical connection between said electrodes, and an electrical connection between the outside surfaces of said plates.

5. A rectifier cell comprising a pair of dished rectifier plates in juxtaposed relation with depressed portions of both plates facing each other, said plates being bonded together to form a hollow chamber at least partly defined by said depressed portions, said depressed portion of each plate having thereon a semi-conductor and an overlying electrode, and an electrical connection between the outer surfaces of said plates.

6. A rectifier cell comprising a pair of dished rectifier plates in juxtaposed relation with depressed portions of both plates facing each other, the rims of said plates being conductively bonded together to form a hollow chamber at least partly defined by said depressed portions, the depressed portion of each plate having thereon a semi-conductor and an overlying electrode, and a resilient electrode contact member within said chamber.

7. A rectifier assembly comprising a pair of metallic rectifier plates, each having a depressed area surrounded by a rim, a semi-conductor and an associated front electrode on the depressed area of each plate, said plates being collocated with their depressed areas facing each other and their rims in contiguous relation with a metal-to-metal bond to form a closed chamber enclosing said semi-conductors and front electrodes, a conductive contact member within said chamber resiliently contacting said front electrodes, and a conductive tubular mounting extending through both plates and said chamber but insulated from the plates, said tubular member being connected to said contact member whereby the tubular member forms a common terminal for said front electrodes.

8. A rectifier assembly comprising a pair of metallic rectifier plates, each having a depressed area surrounded by a rim, a semi-conductor and an associated or front electrode on the depressed area of each plate, said plates being collocated with their depressed areas facing each other and their rims in contiguous relation with a metal-to-metal bond to form a closed chamber enclosing said semi-conductors and front electrodes, a conductive contact member within said chamber resiliently contacting said front electrodes, a conductive tubular mounting member extending through both plates and said chamber but insulated from the plates, said tubular member being connected to said contact member whereby the tubular member forms a common terminal for said front electrodes, and a second conductive tubular mounting member extending through both plates and said chamber and connected to form a common terminal for said plates.

9. A rectifier assembly comprising a pair of metallic rectifier plates, each having a depressed area surrounded by a flat rim, a semi-conductor and an associated front electrode on the depressed area of each plate, said plates being collocated with their depressed areas facing each other and their rims in contiguous relation with a metal-to-metal bond to form a closed chamber enclosing said semi-conductors and front electrodes, a conductive contact member within said chamber resiliently contacting said front electrodes, a conductive tubular mounting member extending through both plates and said chamber but insulated from the plates, said tubular member being connected to said contact member whereby the tubular member forms a common terminal for said front electrodes, and a second conductive tubular mounting member extending through both plates and said chamber and connected to form a common terminal for said plates, the axes of said tubular members being substantially parallel.

10. A rectifier assembly comprising a pair of metallic rectifier plates, each having a depressed area surrounded by a rim, a semi-conductor with an overlying front electrode arranged on the depressed area of each plate, said plates being arranged in juxtaposed relation with the depressed areas of the plates facing each other, the rims of both plates being in contiguous intimate contact thereby forming a closed chamber enclosing said semi-conductors and front electrodes, a resilient conductive member within said chamber and in contact with said front electrodes, and a conductive mounting member extending through both plates but insulated therefrom, said mounting member being connected to said resilient member whereby the mounting member constitutes a common terminal for said front electrodes.

11. A rectifier assembly comprising a pair of metallic rectifier plates, each having a depressed area surrounded by a rim, a semi-conductor with an overlying front electrode arranged on the depressed area of each plate, said plates being arranged in juxtaposed relation with the depressed areas of the plates facing each other, the rims of both plates being in contiguous intimate contact thereby forming a closed chamber enclosing said semi-conductors and front electrodes, a resilient conductive member within said chamber and in contact with said front electrodes, a conductive mounting member extending through both plates but insulated therefrom, said mounting member being connected to said resilient member whereby the mounting member constitutes a common terminal for said front electrodes, and a second conductive mounting member extending through both plates and connected thereto to act as a common terminal for said plates.

12. A rectifier assembly comprising a pair of rectifier plates, each having a depressed active area surrounded by a metallic rim, said plates being collocated with their active areas facing each other and their rims in bonded contiguous conductive contact to form a closed hollow chamber, a resilient member contacting said active areas, and hollow conductive mounting means extending through said plates and said chamber and connected to said resilient member whereby the mounting means constitutes a common terminal for both active areas.

13. A rectifier assembly comprising a pair of rectifier plates, each having a depressed active area surrounded by a metallic rim, said plates being collocated with their active areas facing each other and their rims in bonded contiguous conductive contact to form a closed hollow chamber, a resilient member contacting said active areas, hollow conductive mounting means extending through said plates and said chamber and connected to said resilient member whereby the mounting means constitutes a common terminal for both active areas, and a second hollow conductive mounting means extending through said plates and said chamber and constituting a terminal for said plates.

14. A rectifier assembly comprising a pair of metallic rectifier plates, each having a depressed area surrounded by a rim offset from said area, a semi-conductor and an associated electrode on the depressed area of each plate, said plates being collocated with their depressed areas facing each other, said rims of both plates being seam-welded together to form a closed chamber enclosing said semi-conductors and electrodes, and a resilient electrode contact member within said chamber.

15. A rectifier assembly comprising a pair of metallic rectifier plates, each having a depressed area surrounded by a rim offset from said area, a semi-conductor and an associated electrode on the depressed area of each plate, said plates being collocated with their depressed areas facing each other, said rims of both plates being seam-welded together to form a closed chamber enclosing said semi-conductors and electrodes, a resilient electrode contact member within said chamber, conductive tubular mounting means extending through said plates but insulated therefrom, said mounting means constituting a terminal for said contact member, and a second conductive tubular mounting means extending through and contacting said plates.

16. A rectifier assembly comprising a pair of metallic rectifier plates, each having a depressed area surrounded by a rim, a semi-conductor and an associated front electrode on the depressed area of each plate, said plates being collocated with their depressed areas facing each other, means including said plates and sealing means between said rims for forming a closed chamber enclosing said semi-conductors and front electrodes, a conductive contact member within said chamber resiliently contacting said front electrodes, a conductive tubular mounting member extending through both plates and said chamber but insulated from the plates, said tubular member being connected to said contact member whereby the tubular member forms a common terminal for said front electrodes, and a second conductive tubular mounting member extending through both plates and said chamber and connected to form a common terminal for said plates, said mounting members being symmetrically located whereby the assembly may be mounted in either one of two electrically reversed positions in a stack and occupy substantially the same physical space in either position.

17. A rectifier assembly comprising a pair of rectifier plates, each having an active area, said plates being collocated with their active areas facing each with a space therebetween, means including said plates forming a closed hollow chamber defined at least in part by said active areas, a contact member within said chamber resiliently contacting said active areas, and hollow conductive mounting means extending through said plates and said chamber and connected to said contact member whereby the mounting means constitutes a common terminal for both active areas, said mounting means being insulated from said plates.

18. A rectifier cell comprising a pair of juxtaposed rectifier plates, each having a depressed surface carrying a semiconductor and an overlying electrode, means including said depressed surfaces in face to face relation defining a closed hollow chamber, and means within said chamber forming an electrical connection between said electrodes.

References Cited in the file of this patent

UNITED STATES PATENTS

| | | |
|---|---|---|
| 1,738,113 | Ogden | Dec. 3, 1929 |
| 2,537,961 | Bonner | Jan. 16, 1951 |
| 2,545,863 | Sell et al. | Mar. 20, 1951 |
| 2,665,399 | Lingel | Jan. 5, 1954 |